United States Patent Office 2,940,869
Patented June 14, 1960

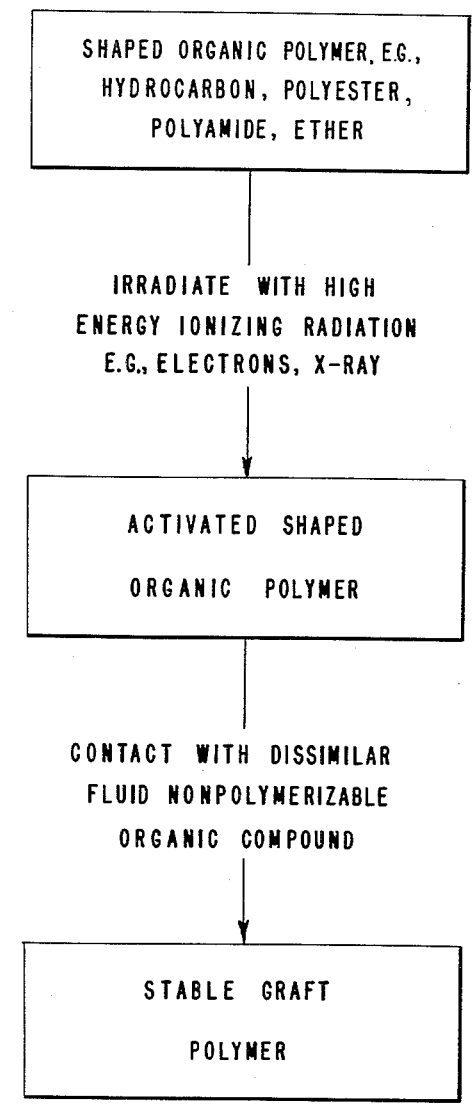

2,940,869

PROCESS OF ADHERING AN ORGANIC COMPOUND TO A SHAPED ORGANIC POLYMER

Boynton Graham, Wilmington, Del., assignor to E. I. du Pont de Nemours and Company, Wilmington, Del., a corporation of Delaware Filed July 12, 1956, Ser. No. 597,324

23 Claims. (Cl. 117—47)

This invention is concerned with the production of coatings and, more specifically, with a new process for adhering a coating of an organic compound to the surface of a shaped organic polymer and the resulting products.

This application is a continuation-in-part of application Serial No. 574,083, filed March 27, 1956, now abandoned.

It is an object of the present invention to provide a process for uniting to the surface of a shaped organic polymer a coating of an organic compound which is non-polymerizable and chemically distinct from the shaped polymer. Another object is to provide such coated products. Other objects will become apparent from the following specification and claims.

There has now been discovered a process for uniting to the surface of a shaped organic polymer a coating of a dissimilar non-polymerizable organic compound which is fluid at a temperature below the softening temperature of the shaped organic polymer, comprising the separate steps of exposing the surface of the shaped organic polymer to at least 1 watt-sec./cm.$^2$ of ionizing radiation, with an energy of at least 0.1 million electron volts, and subsequently, in the absence of radiation and while the activity generated by the radiation is still present, contacting the organic compound in fluid form with the irradiated surface of the shaped polymer to unite a coating of the organic compound to the surface of the irradiated shaped polymer. This process is illustrated broadly by the appended drawing, a self-explanatory flowsheet therefor. The coatings or deposits so applied cannot be removed from the polymer surface by treatment with solvents which normally dissolve the organic compound so added.

Shaped organic polymers suitable for treatment include any normally solid organic polymeric material, particularly those with molecular weights in excess of 500 and especially in excess of 1000. The polymers may be oriented or unoriented. Thus, there may be employed hydrocarbon polymers, such as polyethylene, polystyrene, polybutadiene, rubber, polyisobutylene, butadiene/styrene copolymers and the like; halogenated hydrocarbon polymers, such as polyvinyl chloride, polyvinylidene chloride, polychloroprene, polytetrafluoroethylene, polyvinyl fluoride and the like; ester-containing polymers, such as polyvinyl acetate, polymethyl methacrylate, polyethylene terephthalate and the like; hydroxyl-containing polymers, such as polyvinyl alcohol, cellulose, regenerated cellulose and the like; ether-containing polymers, such as solid polytetrahydrofuran, polyformaldehyde, dioxolane polymers and the like; condensation polymers, such as phenol-formaldehyde polymers, urea-formaldehyde polymers, triazine-formaldehyde polymers, polyamides, polyimides, and the like; polyacrylonitrile, polyvinyl acetals and mixtures or copolymers based on two or more of the above compounds, as well as natural polymers such as cotton, wool, silk and the like.

The dissimilar non-polymerizable organic compound is an organic material which is chemically distinct from the shaped organic polymer or its corresponding monomer, is free of units of carbon-to-carbon unsaturation which are polymerizable by any of the customary free radical-type or ionic-type polymerization catalysts, and is capable of being flowed over the shaped polymer. The organic compound must be fluid or become fluid at a temperature below the softening temperature of the shaped polymer so that the shape of the shaped polymer will not be destroyed in the contacting step of the process. By the same token it is preferred that, at the temperature employed in the contacting step, the organic compound have no appreciable solvent or marked swelling action on the polymer. When the organic compound is a solvent for the shaped polymer, the contacting step must be terminated before any substantial physical alteration of the shaped polymer due to the solvent action of the organic compound takes place. When contacted with the shaped polymer, the fusible organic compound may be an elastic or an inelastic fluid. Thus, it may be in the form of a gas, liquid or a viscous melt at the time of contact. Gases are readily contacted by placing the irradiated shaped polymer in an evacuated space and admitting the gas as shown subsequently in Example VI. Readily flowable liquids may be contacted by pouring them over the irradiated shaped polymer as in Example I or by spraying or dipping. Viscous melts may be contacted by mechanical spreading. For example, an irradiated polymer in film form may be contacted with a viscous melt by bringing the two together in a calender.

The chemical nature of the organic compound may be varied widely within the limitations noted above. Thus, it may be a compound containing at least one C—X bond, where X is hydrogen, halogen, or carbon, such as a hydrocarbon, halogenated hydrocarbon, alcohol, amine, aldehyde, ketone, ether, acid, ester, amide, phenol, sulfonic acid, nitro compound, fat, synthetic polymer and the like. By reason of enhanced reactivity a preferred group of organic compounds are the chain transfer agents or telogens. Another preferred group, also highly reactive, are the ethers, particularly the low melting (e.g., below 100° C.) polymeric ethers.

Fusible organic polymers are particularly suitable for forming adherent coatings according to this invention. These include liquid and low melting hydrocarbons, such as polyethylene, polypropylene, polybutylene, low molecular weight polystyrene and the like; ester-containing polymers, such as polyvinyl acetate, polyvinyl butyrate, polymethyl acrylate, polymethyl methacrylate and the like; polymeric ethers, such as polyethylene oxide, polypropylene oxide, polytetrahydrofuran, polyvinyl ethers, dioxolane polymers and the like; polyvinyl acetals, low softening vinyl halide/vinyl ester copolymers, dextrins and the like.

While mixtures of two or more of the above fusible organic compounds may be used, and indeed may be preferred where several different surface properties are to be modified in a single treatment, it should be noted that solutions of such compounds are generally to be avoided, since the solvent may be undesirably reactive with the irradiated substrate.

Suitable ionizing radiations include both radiation in the form sometimes regarded as particle radiation and radiation in the form sometimes regarded as ionizing electromagnetic radiation. Because of availability and convenience, electron radiation and gamma rays are preferred.

By particle radiation is meant an emission of accelerated electrons or nuclear particles such as protons, neutons, alpha particles, deutrons, beta particles, or the like, so that the said particle impinges upon the shaped organic polymer. The charged particles may be accelerated by means of a suitable voltage gradient, using such devices as a cathode ray tube, a resonant cavity accelerator, a Van de Graaff accelerator, a betatron, a synchrotron, cyclotron or the like, as is well known to those skilled in the art. Neutron radiation may be produced by bombardment of selected light metal (e.g., beryllium) targets with high energy positive particles. In addition, particle radiation suitable for carrying out the process of the invention may be obtained from an atomic pile, or from radioactive isotopes or from other natural or artificial radioactive materials.

By ionizing electromagnetic radiation is meant radiation produced when a metal target (e.g., tungsten) is bombarded by electrons possessing appropriate energy. Such energy is imparted to electrons by accelerating potentials in excess of 0.1 million electron volts (0.1 m.e.v.), with 0.5 m.e.v. and over preferred. Such radiation, conventionally termed X-ray, will have a short wave length limit of about 0.01 Angstrom units (in the case of 1 m.e.v.) and a spectral distribution of energy at longer wave lengths determined by the target material and the applied voltage. In addition to X-rays produced as indicated above, ionizing electromagnetic radiation suitable for carrying out the process of the invention may be obtained from a nuclear reactor ("pile") or from natural or artificial radioactive material, for example, cobalt 60. In all of these latter cases the radiation is conventionally termed gamma rays. While gamma radiation is distinguished from X-radiation only with reference to its origin, it may be noted that the spectral distribution of X-rays is different from that of gamma rays, the latter frequently being essentially monochromatic, which is never the case with X-rays produced by electron bombardment of a target.

The manner in which the fusible organic compound becomes united to the surface of the irradiated shaped polymer is not fully understood. As illustrated in the examples which follow, the coating cannot be removed by solvents which would ordinarily dissolve the fusible organic compound. It appears probable that the coating becomes chemically attached to the irradiated surface by a covalent bond structure. The dissimilar non-polymerizable organic compound may not be bound "in toto" and without modification to the irradiated substrate in the practice of this invention. It is possible that the binding reaction involves rupture and rearrangement of coordinate bonds and that the organic compound is bound in an altered form resulting from such ruptures and rearrangements.

In any case, the manner of attachment is different from and preferable to the purely physical increase in adhesiveness which is known to result from surface treatments of polymeric films by flames, ozone, ultraviolet light, corona or spark discharges, etc. In such treatments, improved adhesion of substances such as printing inks has been shown by the conventional "Scotch tape test," which measures purely physical adhesion, but none of the adhered products of these processes has been found to withstand extraction with a solvent for the coating. In further contrast, the unusually reactive surface activity which is utilized in the process of this invention is relatively short-lived unless, as discussed herein, special storage precautions are taken to preserve it, whereas the previous treatments have relied on an effect which, in addition to being of a different nature and a considerably lower activity, does not decay even when the irradiated polymeric substrate is stored in air and at elevated temperatures.

*Example 1*

A film of polyethylene 0.002 inch thick is placed in an aluminum box which has a window of 0.0008 inch aluminum foil 4 cm. above the sample. The system is flushed with nitrogen while it is passed twenty times at a rate of 2 cm./sec. under a 250 microampere beam of 2 m.e.v. electrons from a 2 million volt Van de Graaff accelerator which, at a window-to-sample distance of 10 cm., operates at a scan width of 20 cm. A total exposure of 250 watt-sec./cm.$^2$ is delivered over a period of about 20 minutes. The box containing the irradiated film is removed from the electron beam. Ninety seconds after irradiation is completed, polyethylene oxide of 6,000 molecular weight ("Carbowax" 6,000 W), which has been melted and preheated to 100° C., is admitted to the system in amount sufficient to cover the film with molten polymer. The system is kept at 100° C. with continued passage of nitrogen for one hour. The film is then extracted for 16 hours with hot running water, followed by extraction for 8 hours with ethanol in a Soxhlet extractor. A control film is similarly irradiated and extracted, but the contacting with polyethylene oxide is omitted. The treated film is unchanged in appearance to the naked eye. It is found to have lost 0.50% in weight (compared to the weight of the film before irradiation), whereas the control film loses 0.65% in weight. The water wettability of the films is determined by measuring the angle of inclination at which the retreating edge of a 0.05 ml. droplet of water will travel at a rate of 0.1 mm./second. In this "sliding-tilt angle" test, the treated film, with an average sliding-tilt angle of 50°, is more hydrophobic than the control film, which has an average sliding-tilt angle of 62°.

*Example 2*

A film of polyethylene terephthalate 0.001 inch thick is subjected to the procedure of Example 1. The treated film has a weight gain of 1.01%, whereas a control film has a weight gain of 0.6%. The treated film has a sliding-tilt angle of 42° as compared to a control value of 46°.

*Example 3*

A film of polyethylene terephthalate 0.001 inch thick is irradiated under nitrogen as in Example 1 for forty passes (500 watt-sec./cm.$^2$) during about forty minutes. The film is then removed from the electron beam. Thirty seconds after the irradiation is completed, polyethylene oxide of 20,000 molecular weight ("Carbowax" 20 M), which has been melted and preheated at 100° C., is admitted to the system in amount sufficient to cover the film with molten polymer. After five minutes, air is admitted to the system, and after thirty minutes, the film is removed and extracted for twenty hours with ethanol in a Soxhlet extractor. Control films of polyethylene terephthalate are prepared as follows: (*a*) untreated, (*b*) treated with polyethylene oxide of 20,000 molecular weight without prior irradiation, and (*c*) irradiated without subsequent treatment with polyethylene oxide. The fully treated film is found to exhibit improved receptivity for acetate dyes and vat dyes over any of the controls. The acetate dyes employed include the blue dye obtained according to the procedure of Example IX of U.S. Patent 2,050,704; the red dye described in the example in Swiss Patent 149,405 and the red dye described in the example in Swiss Patent 151,868. The vat dyes employed include the green vat dye paste of Colour Index Number 1101 having approximately an 11% color content and the blue vat dye of Colour Index Number 1112 obtained according to German Patent 331,283 when the chlorination is carried out until a chlorine content of about 5% is obtained. The dyes are applied according to the standard procedure shown in "Official Methods of Dyeing" (revised edition) issued in 1941 by the Technical Laboratory of the Dyestuffs Division of the Organic Chemicals Department of E. I. du Pont de Nemours and Company.

*Example 4*

A film of polyethylene 0.002 inch thick is subjected to the process described in Example 3. The treated film is more receptive than the corresponding controls to the acetate red dye described in the example of Swiss Patent 151,868.

*Example 5*

A film of polyethylene 0.002 inch thick is enclosed in aluminum foil 0.0007 inch thick and irradiated with electrons at 2 m.e.v., 250 microamps., a window-to-sample distance of 10 cm., a scan width of 20 cm. and a pass rate of 2 cm./second for 20 passes (250 watt-sec./cm.$^2$) during about twenty minutes while heated at 60° C. Ten minutes after the irradiation is completed, the film is immersed in polyethylene oxide of 6,000 molecular weight which has been melted and preheated to 80° C. After one hour, the film is removed from the polyethylene oxide and extracted for 16 hours in hot running water, followed by extraction for 12 hours with ethanol in a Soxhlet extractor. The resulting film is unchanged in appearance and is more receptive than controls to the red dye described in the example of Swiss Patent 151,868. In the sliding-tilt angle test described in Example 1, the treated film is less readily wet by water than a control film which is similarly irradiated and extracted, but has not been contacted with polyethylene oxide.

*Example 6*

Fabrics of nylon and cotton are sealed in a glass tube under vacuum and irradiated with 2 m.e.v. electrons at 250 microamps. for 125 watt-sec./cm.$^2$ while the tube is supported on a batt of fiberglass. The tube is stored at −78°C. for 2½ hours. It is then connected to an evacuated vessel containing liquid $C^{14}H_3OCH_2CH_2OH$, also at −78° C., and a stopcock between the vessels is opened. The system is evacuated again while still cold to remove gases generated during irradiation, sealed off from the atmosphere and stored at room temperature for about 16 hours during which time the fabrics are in contact with the vapors of the radiocarbon β-methoxyethanol. The fabrics are removed, extracted with acetone in a Soxhlet extractor for five hours and dried under vacuum at 100° C. for 15 hours. In a separate experiment, control fabrics of nylon and cotton are similarly treated except that irradiation is omitted. All of the fabrics are examined for radioactivity with an end window Geiger counter (Tracerlab Superscaler) and the results are shown in the following table:

| Fabric: | Counts per minute above background |
|---|---|
| Nylon (irradiated and exposed) | 12.9 |
| Nylon control (exposed only) | 0 |
| Cotton (irradiated and exposed) | 14.2 |
| Cotton control (exposed only) | 4.2 |

On the basis of a separate calibration of the Geiger counter against the method of analysis wherein a radioactive sample is burned and the resulting radio-active carbon dioxide is determined, it is calculated that ten counts per minute above background for the nylon fabric is equivalent to 0.02% $C^{14}H_3OCH_2CH_2OH$ on the fabric.

*Example 7*

A film of polyethylene 0.002 inch thick is irradiated in air at 40° C. at an exposure of 500 watt-sec./cm.$^2$, using 2 m.e.v. electrons at 250 microamps during about forty minutes. Thirty seconds after irradiation is completed, the film is immersed in ampyl alcohol-1-$C^{14}$ ($CH_3CH_2CH_2CH_2C^{14}H_2OH$). After standing for 15 minutes at room temperature, the film is removed, air-dried, extracted for 24 hours with ethyl ether in a Soxhlet extractor and dried for four hours at room temperature in a vacuum. When examined for retained radioactivity as in Example 6, the treated film exhibits an activity of 11 counts per minute above background, whereas a control which has been immersed in the amyl alcohol-1-$C^{14}$ without prior irradiation and then similarly extracted and dried exhibits an activity of only four counts per minute above background.

The shape of the organic polymer employed in the present invention is not limited. It may be a film or a woven fabric as illustrated in the foregoing examples. Also, it may be a molded object, fiber, knitted fabric, tube, pipe, beading, tape, extruded molding, wire covering, powder or the like. Of particular advantage are the film, fiber, fabric, and various extruded forms since they are readily adapted to continuous operation according to the process of this invention. Shaped polymers in these forms may be unrolled or extruded into the path of ionizing radiation and then either run substantially immediately into contact with the flowable organic compound or wound up and contacted with the organic compound in a separate treatment.

An important advantage of the present invention is that the irradiation step can be carried out independent of the contacting step. Thus, it is possible to irradiate the shaped polymer under conditions most adaptable for irradiation, as in an atomic pile or under the influence of a particle accelerator. The contacting step can be carried out later under conditions best adapted for it and free of the often cumbersome radiation apparatus. Also, with this process radiation-sensitive organic coating materials need not be exposed to the radiation.

The time which may elapse between the irradiation step and the contacting step will vary with the radiation exposure, temperature and atmosphere of storage, and the chemical nature of the irradiated polymer. A storage time of not over five minutes between steps is usually preferred and substantially immediate contact (less than one second) may be desirable. However, the effects of the irradiation can be preserved for longer periods of time, i.e., weeks and even months, particularly if the irradiated shaped polymer is kept in an inert atmosphere, such as nitrogen, argon, helium or the like, and/or is stored at low temperature. In general, the lower the temperature at which the irradiated shaped polymer is stored, the longer the time the surface remains active toward adhering a coating of a fusible organic compound and storage temperatures as low as −80° C. may be desirable. It is thus possible to irradiate the shaped polymer at a site of available radiation and then by maintaining suitable storage conditions as above to ship the irradiated polymer to another site for carrying out the contacting step.

There are various methods of determining the useful lifetime of the surface activity. Thus the irradiated polymer may be contacted with a radioactive tagged compound, extracted with a solvent for the compound and finally examined for retained radioactivity, as is described in Examples 6 and 7.

It will be readily understood that the amount of ionizing radiation used to activate a solid polymer surface so that it will attach to itself a coating of a dissimilar organic material applied in fluid form will depend upon the type of radiation used, the nature of the polymer being irradiated, and the nature of the compound from which the coating is formed.

Usually a minimum exposure of at least 1 watt-sec./cm.$^2$ at the surface is necessary since lower amounts of exposure do not give adequate surface activation. The degree of surface activation usually increases with increasing amounts of exposure. Upper exposure limits depend on the degree of activation desired and on the radiation resistance of the polymeric substrate. Exposures as high as 1000 to 10,000 watt-sec./cm.$^2$ may be utilized in the case of radiation-resistant polymers such as polystyrene and polyethylene terephthalate, whereas exposures of 100 to 1000 watt-sec./cm.$^2$ may suffice for more sensitive polymers such as polyvinyl chloride and the polyamides. Any convenient beam output amperage may be used with an appropriate total time of irradiation to give the required exposure, and the exposure may be carried out in one slow pass or in several faster ones.

High energy ionizing radiation, e.g., 0.1–5.0 m.e.v., and preferably 1.0–2.0 m.e.v. is preferred since it yields activated polymeric substrates which maintain their surface activity or fixing action toward dissimilar non-polymerizable organic compounds for relatively longer periods of time when stored in air or at temperatures above about −70° C. than do substrates which are subjected to lower energy radiation.

The temperature at which the contacting step of this invention is conducted may vary between the fusion temperature of the fusible organic compound as a lower limit and the softening temperature of the shaped polymer as an upper limit. Thus temperatures from −70° C. to 300° C. may be employed, depending on the thermal properties of the reactants. Elevated temperatures (e.g. 50–100° C.) generally give faster reactions. The time during which contact between the fusible organic compound and the irradiated shaped polymer is maintained may be varied between wide limits. A substantial portion of the coating reaction occurs within the first 3–5 seconds of contact. Accordingly, a contact time of at least one second is preferred. The total duration of contact may be extensively prolonged if convenient, but no significant amount of coating is attached after 24 hours of contact and this accordingly represents a preferred upper limit of contact time.

The process of the present invention is valuable in creating surface effects upon shaped articles produced from organic polymers. It may be employed upon textiles to affect softness, resilience, tendency to shrink, static propensity, dyeability, pilling, hydrophilicity, wickability, and the like. It is useful in varying such properties as abrasion and wear resistance, moisture regain, drycleaning properties, light durability, soilability, ease of soil removal, laundering properties, dyeability (depth, rate, permanence and uniformity), printability, washfastness of dyes or finishing treatments (resins, ultraviolet absorbers, etc.), handle and drap properties (stiffening or softening), heat-yellowing, snag resistance, ease in textile processability, solubility (insolubilization or increase in solubility), bleachability, surface reactivity, delustering action, drying properties, thermal and electrical conductivity, transparency, light transmittance, air and water permeability, fabric comfort, felting, ion exchange properties, adhesion, over-all appearance and combinations of these as well as others.

In addition to the above modifications which is may be desirable to effect in fibrous articles, there are other modifications which are particularly useful in other substrates, for example, in films and rigid and semi-rigid molded and extruded forms. By way of illustration, polymeric films may be modified to improve adhesion to various coating or laminating agents which it may be desirable to adhere thereto, to change "slip" or the ease with which one film slides over another, to produce non-reflective or decorative coatings on film or sheet, to improve the ease of printing colors on such sheet and many other modifications such as will readily suggest themselves to one skilled in the art.

Since many different embodiments of the invention may be made without departing from the spirit and scope thereof, it is to be understood that the invention is not limited by the specific illustrations except to the extent defined in the following claims.

What is claimed is:

1. In a process for applying a coating to the surface of a shaped organic polymer, the improvement for adhering an organic compound which is chemically distinct from the polymer, non-polymerizable and fluid at a temperature below the softening temperature of the shaped polymer, comprising the separate steps of exposing the surface of the shaped organic polymer before the coating is applied to at least 1 watt-second per square centimeter of surface of an ionizing radiation with an energy of at least 0.1 million electron volts to activate the surface to be coated and thereby activating the same, and then, in the absence of ionizing radiation while said surface is still activated, applying said compound in fluid form to said surface to form a coating which remains united to the polymer even when treated with solvents which normally dissolve said compound.

2. A process as defined in claim 1 wherein said organic polymer is a hydrocarbon polymer.

3. A process as defined in claim 1 wherein said organic polymer is a polyester.

4. A process as defined in claim 1 wherein said organic polymer is a polyamide.

5. A process as defined in claim 1 wherein said organic compound is an ether melting below 100° C.

6. A process as defined in claim 1 wherein said organic compound is a polymer melting below 100° C.

7. A process as defined in claim 1 wherein said ionizing radiation is radiation from a high voltage electron accelerator.

8. A process as defined in claim 1 wherein said ionizing radiation is an electron beam having an energy of 0.1 to 3 million electron volts.

9. The process which comprises exposing the surface of a polyethylene shape to at least 1 watt-second per square centimeter of surface of an ionizing radiation of an energy of at least 0.1 million electron volts and thereby activating the same, and then, in the absence of ionizing radiation and while said surface is still activated, contacting the polyethylene with a non-polymerizable fluid organic ether and thereby bonding said ether to the polyethylene.

10. The process of claim 9 wherein the ionizing radiation is electrons.

11. The process of claim 10 wherein the ether is polyethylene oxide.

12. The process which comprises exposing the surface of a polyethylene terephthalate shape to at least 1 watt-second per square centimeter of surface of an ionizing radiation of at least 0.1 million electron volts and thereby activating the same, and then, in the absence of ionizing radiation and while said surface is still activated, contacting the polyethylene terephthalate with a non-polymerizable fluid organic ether and thereby bonding said ether to the polyethylene terephthalate.

13. The process of claim 12 wherein the ionizing radiation is electrons.

14. The process of claim 13 wherein the ether is polyethylene oxide.

15. The process which comprises exposing the surface of a nylon shape to at least 1 watt-second per square centimeter of surface of an ionizing radiation of at least 0.1 million electron volts and thereby activating the same, and then, in the absence of ionizing radiation and while said surface is still activated, contacting the nylon with a non-polymerizable fluid organic ether and thereby bonding said ether to the nylon.

16. The process of claim 15 wherein the ionizing radiation is electrons.

17. The process of claim 16 wherein the ether is β-methoxyethanol.

18. The process which comprises exposing the surface of a cotton shape to at least 1 watt-second per square centimeter of surface of an ionizing radiation of at least 0.1 million electron volts and thereby activating the same, and then, in the absence of ionizing radiation and while said surface is still activated, contacting the cotton with a non-polymerizable fluid organic ether and thereby bonding said ether to the cotton.

19. The process of claim 18 wherein the ionizing radiation is electrons.

20. The process of claim 19 wherein the ether is β-methoxyethanol.

21. The process which comprises exposing the surface of a polyethylene shape to at least 1 watt-second per square centimeter of surface of an ionizing radiation of at least 0.1 million electron volts and thereby activating the same, and then, in the absence of ionizing radiation and while said surface is still activated, contacting the polyethylene with a non-polymerizable fluid alcohol and thereby bonding said alcohol to the polyethylene.

22. The process of claim 21 wherein the ionizing radiation is electrons.

23. The process of claim 22 wherein the alcohol is amyl alcohol.

References Cited in the file of this patent

UNITED STATES PATENTS

| | | |
|---|---|---|
| 2,465,713 | Dimmick | Mar. 29, 1949 |
| 2,668,133 | Brophy | Feb. 2, 1954 |
| 2,790,736 | McLaughlin | Apr. 30, 1957 |

FOREIGN PATENTS

| | | |
|---|---|---|
| 665,263 | Great Britain | Jan. 23, 1952 |
| 1,058,934 | France | Nov. 10, 1953 |

OTHER REFERENCES

"Chem. Eng.," September 1955, pp. 228, 232, and 234. (Copy in 204/158.1.)

"Modern Plastics" (1), vol. 32, No. 10, pages 159, 252 and 254 (117–Rad.).